United States Patent
Schmid et al.

(10) Patent No.: US 8,857,921 B2
(45) Date of Patent: Oct. 14, 2014

(54) VEHICLE WHEEL

(75) Inventors: Wolfgang Schmid, Freising (DE);
Karl-Heinz Meitinger, München (DE);
Christoph Kossira, Ingolstadt (DE);
Heinrich Beringer, Denkendorf (DE)

(73) Assignee: Audi AG, Ingolstadt (DE)

( * ) Notice: Subject to any disclaimer, the term of this patent is extended or adjusted under 35 U.S.C. 154(b) by 285 days.

(21) Appl. No.: 13/441,350

(22) Filed: Apr. 6, 2012

(65) Prior Publication Data

US 2012/0256473 A1    Oct. 11, 2012

(30) Foreign Application Priority Data

Apr. 8, 2011 (DE) .................... 10 2011 016 535

(51) Int. Cl.
| | | |
|---|---|---|
| B60B 7/04 | (2006.01) | |
| B60B 3/10 | (2006.01) | |
| B60B 7/00 | (2006.01) | |
| B60B 19/10 | (2006.01) | |

(52) U.S. Cl.
CPC .............. *B60B 3/10* (2013.01); *B60B 2900/212* (2013.01); *B60B 7/0086* (2013.01); *B60B 7/00* (2013.01); *B60B 2900/513* (2013.01); *B60B 2900/1216* (2013.01); *B60B 19/10* (2013.01); *B60Y 2200/11* (2013.01)
USPC ...................................... 301/37.107; 301/6.3

(58) Field of Classification Search
CPC .............. B60B 7/04; B60B 7/065; B60B 3/10
USPC ........ 301/6.3, 37.25, 37.102, 37.106, 37.107; 188/71.6
See application file for complete search history.

(56) References Cited

U.S. PATENT DOCUMENTS

| | | | |
|---|---|---|---|
| 4,593,953 A | | 6/1986 | Baba et al. |
| 7,594,567 B2 * | | 9/2009 | Sabelstrom et al. ...... 188/218 A |
| 7,806,485 B1 * | | 10/2010 | Nelson et al. .............. 301/37.25 |
| 2007/0246996 A1 * | | 10/2007 | Footit ....................... 301/37.108 |
| 2009/0195053 A1 * | | 8/2009 | Kruse et al. ................... 301/6.4 |

FOREIGN PATENT DOCUMENTS

| | | |
|---|---|---|
| CN | 103068589 | 4/2013 |
| DE | 33 28 519 A1 | 2/1985 |
| DE | 3816415 A1 * | 11/1989 |
| EP | 0 145 487 A2 | 6/1985 |
| FR | 2886214 A1 * | 12/2006 |
| JP | 61244601 A * | 10/1986 |

* cited by examiner

*Primary Examiner* — Kip T Kotter
(74) *Attorney, Agent, or Firm* — Henry M. Feiereisen LLC (57) ABSTRACT

Vehicle wheel including a wheel rim a brake pot fastened to the latter and a brake disc fastened to the brake pot, wherein multiple pivotally supported plate shaped cover elements are provided on the wheel rim for temporarily closing assigned wheel rim side openings, wherein each cover element is movable along the pivot axis in opposition to the force of a restoring element an is connected to the wheel rim via a couple element which force guides in case of a shifting movement, by means of which the cover element is moved from a open position to a closed position, which the cover element assumes when the wheel rotates.

12 Claims, 8 Drawing Sheets

VEHICLE WHEEL

CROSS-REFERENCES TO RELATED APPLICATIONS

This application claims the priority of German Patent Application, Serial No. 10 2011 016 535.5, filed Apr. 8, 2011, pursuant to 35 U.S.C. 119(a)-(d), the disclosure of which is incorporated herein by reference.

BACKGROUND OF THE INVENTION

The present invention relates to a vehicle wheel.

The following discussion of related art is provided to assist the reader in understanding the advantages of the invention, and is not to be construed as an admission that this related art is prior art to this invention.

The conception of modern wheel rims is subject to various, partially conflicting, demands. Beside a simple wheel rim contour which enables an easy manufacture, a central demand is that the wheel rim allows a maximal air flow through the wheel rim to be able to optimally cool the wheel rim by the air flow if needed. Further, during a residual heating period of the brake disc at standstill, it has to be ensured that the heat can be dissipated also without air flow. This results in the demand for a maximally "open" wheel rim structure.

However, for aerodynamic reasons the wheel rim should be maximally closed, to prevent air turbulences as far as possible, which are generated by openings in the wheel rim. During normal driving, an overpressure exists in the region of the underside of the vehicle, which ensures that air is pushed through the free spaces of the wheel rim. If the wheel rim was configured as closed disc, the cw-value which is included in the calculation of the air resistance of the vehicle could be improved.

In order to meet these requirements which quasi contradict one another on one hand for thermal reasons and on the other hand for aerodynamic reasons, it is known to be able to open and close the wheel rim side openings depending on the need. In such systems, the plate shaped cover elements are usually pivotally supported and movable radially along the pivot axis. The cover elements are each additionally connected to the wheel rim via a force guiding coupling element. The centrifugal force acting on the cover elements increases with increasing rotational speed of the wheel which causes the cover elements to move outwardly starting from a radially inner position in which they open the respectively assigned opening, wherein during this radial movement which is due to centrifugal force, the cover elements pivot from the open position into the closed position as a result of the forced guidance via the coupling element. This radial movement occurs against the force of a restoring element, usually a spring which urges the respective cover element radially inwards again which, however, due to the high centrifugal forces is overcome and pushed back. When the rotational speed of the wheel decreases again the movement is inverted. The cover elements open automatically via the force guiding coupling element when the decreasing centrifugal forces allow the restoring element to cause the cover elements to move radially inward, and to assume their inner position.

EP 0 145 487 A2 discloses a temperature controlled actuating element, for example in the form of a memory alloy or a thermal bimetal, which deforms when reaching a sufficiently high actuating temperature and thereby exerts a force on the assigned cover element in order to urge the latter from the radially outward position back into the radially inward open position. This mechanism has the purpose to enable cooling via an air flow through the wheel rim when, in spite of high driving speeds, the temperature in the region of the brake is sufficiently high to absolutely require the cooling. Here, the high centrifugal force has to be overcome, to push the cover element back again via the force guiding coupling element. This places high demands on the respective thermally controlled actuation elements, which thus have to have the corresponding working capacity.

In principle, several distinguishable states result from the previously mentioned demands on an "active" vehicle wheel. When the vehicle is stationary, the plate shaped cover elements are open. On one hand, this creates a 3D-Effect (depth perception) which is often desired for design reasons, on the other hand the waste heat can be dissipated through the wheel rim, when the brake has residual heat as a result of a previous drive. Above a certain vehicle speed for example 30-40 km/h the design of the wheel can no longer be differentiated by the human eye, only a rotating disc is visible. Above this threshold speed the cover elements should close, to improve the aerodynamics. On the other hand, when the brake is operated during the drive, and the brake disc heats up, the cover elements have to open again in order to ensure aeration of the brake system. Thus, the following changes of states result with regard to the cover element:

Cover element open→cover element closed, when:
$v > v_{grenz}$ and $T < T_{grenz}$
Cover element closed→cover element open when:
$v < v_{grenz}$ or $T > T_{grenz}$ wherein v means the actual speed, $v_{grenz}$ the previously described threshold speed, T the actual temperature in the region of the vehicle brake, and $T_{grenz}$ a threshold temperature above which the cover elements are to be opened.

In known vehicle wheels with the previously described movable force guided cover elements, the rigidity or stiffness of the force guide via which the coupling element poses a problem however, for example when driving toward a curb during parking or in the case of vandalism. In both cases, the cover element is located in the pivoted out, open position, i.e. positioned in the wheel rim inner starting position. When the vehicle approaches the curb, it can occur that the cover element first abuts the curb with its pivoted section which projects sideways from the wheel rim plane. When proceeding with the vehicle movement, pressure may be exerted locally on a point of the cover element which is very close to the pivot axis, and thus a short lever exists and very high forces act on the bearing of the cover element, because the cover element does not follow the applied pressure due to the rigidity or stiffness of the force guiding. In the extreme case, damage to the cover element can result. Also in the case of vandalism, when pushing strongly against the projecting section of the cover element, damage can result.

It would therefore be desirable and advantageous to provide an improved vehicle wheel which allows closing the plate shaped cover elements also in case of negligible centrifugal forces by applying a limited force.

SUMMARY OF THE INVENTION

According to one aspect of the present invention, a vehicle wheel includes a wheel rim, plural plate shaped cover elements mounted on the wheel rim for pivoting about a pivot axis for temporarily closing corresponding openings in the wheel rim; a coupling element provided for each cover element for connecting the cover element to the wheel rim and guiding the cover element from an open position into a closed position during a movement of the cover element along the pivot axis in response to a centrifugal force, and an elastic structure associated to the coupling element for limiting a force required for moving the cover element from the open position to the closed position.

According to another advantageous feature of the present invention, the coupling element can include the elastic structure.

According to another advantageous feature of the present invention, the coupling rod can be supported on the wheel rim and/or the cover element by the elastic structure.

Particularly advantageously, no "rigid" couple element is used, but a couple element with an integrated elasticity or elastic structure, or respectively a couple element, which is supported against such an elasticity or elastic structure on the wheel rim side or cover element side. The couple element is of course able to carry out its force guiding at sufficiently high rotational speed of the wheel for automatic closing, i.e. its original function. The integration of the elasticity or the support of the coupling element against the latter according to the invention, allows limiting the force required for movement from the open position which the respective cover element assumes at standstill or when driving slowly, into the closed position. The force which has to be applied thus only has to overcome and push back the respective integrated elasticity, to move the respective cover element from the pivoted-open open position to the closed position. The stiffness or rigidity of the force guiding or the coupled movement, respectively is no longer the limiting factor for the force which has to be applied, but the stiffness of the integrated elasticity. The cover element is thus here quasi decoupled with regard to moving from the open into the closed position at stand still or when driving slowly respectively, i.e. without the influence of significant centrifugal forces.

In the described exemplary case of a parking procedure, this means that when approaching the curb and a cover element abuts the latter the cover element is pivoted in with little use of force when proceeding with the vehicle movement, i.e. transitions into the closed position and thus aligns with the wheel rim without great forces acting. This is because the pressure applied by the curb does not have to be great to cause this pivoting-in movement, since only the integrated elasticity has to be overcome by pushing it back. Also in the case of a manual pushing against the projecting cover element section, the cover element pivots in when applying relatively small forces which is advantageous for avoiding damage.

According to another advantageous feature of the present invention, the elastic structure can be formed by at least one spring element or at least one element made of an elastic material. However, the integration of an element which is made of an elastic material such as for example an elastic plastic buffer for example a rubber buffer or the like is conceivable as well. Any material can be used so long as it enables the coupling according to the invention.

According to another advantageous feature of the present invention, the coupling element is a coupling rod. With one end, this coupling rod is movably fixed to the wheel rim, for example via a ball joint, which allows a pivoting and tilting movement. With the other end, it is arranged on the cover element in the same way, for example via a ball joint, wherein there, only a pivot bearing is provided. When the cover element moves radially outward, a linear movement results together with a pivoting movement about the pivot axis of the cover element, because the coupling rod does not change its length resulting from the fixing of the rigid coupling rod on the wheel rim and on the cover element.

According to another advantageous feature of the present invention, the coupling rod can include two sections which are axially movable relative to one another via the elastic structure. Thus, they are movable telescopically relative to one another against the elasticity of the spring element, for example a helical spring. During the movement of a cover element radially outward due to centrifugal force, the coupling rod shows insofar rigid behavior as it does not change its length. At low speed or at standstill the rod length changes however, when the cover element is pushed against externally, i.e. that the one rod section, namely the one which is arranged on the cover element, is moved against the elasticity in the direction of the section which is arranged on the side of the wheel rim, i.e. the coupling rod shortens somewhat which enables the pivoting-in of the cover element. The stiffness or spring constant, respectively, of the integrated elasticity defines the force which has to be applied in order to pivot-in the cover element. Of course, instead of a helical spring, an elastic plastic element such as for example a rubber element or the like can also be provided, the spring constant of which defines the actuating force.

According to another advantageous feature of the present invention, the coupling rod can be made of the elastic structure. The integrated elasticity can also be realized in that the coupling element is elastically flexible in itself. This means that the coupling element is made of a sufficiently stiff material which, however, is elastic in itself to a certain degree to allow the closing according to the invention by pushing with sufficient force. The coupling element thus becomes bend itself in case of closing and returns into the stretched starting position after relief.

As an alternative for integrating the elasticity, i.e. the spring or the like in the two part coupling rod it is also conceivable to configure the coupling rod one-piece and support the latter for example in its pivot bearing on the cover element quasi against the elasticity. This means that the cover element is pushed closed when an external force pushes against it and thereby moved against an elasticity in the region of the rod bearing, wherein this elasticity is deformed and simultaneously the coupling rod is slightly lifted.

According to another advantageous feature of the present invention, the coupling element is a sleeve, which is supported on the cover element via the elastic structure, wherein the sleeve is traversed by and in interacting relationship with a rod which forms the pivot axis. Also in this embodiment, which thus provides for a type of slotted guide for example made of groove and pilot pin in the region of the movement-coupling sleeve, a forced guiding is given when the cover elements are moved radially outward. At low rotational speeds or at standstill, the respective cover element can be pushed against with a limited force in this case as well, which cover element in this embodiment is moved relative to the sleeve which is supported on the cover element via the elasticity, and pivots into the closed position. For example, a spring element in the form of a helical spring or the like is provided for this purpose as well, i.e. a torsion spring. The sleeve remains stationary in this movement which is initiated via the actuating element, the cover element is moved against the elasticity, i.e. the spring, which is thereby deformed until the closed position is reached. In this case as well only the restoring force of the elasticity thus has to be overcome by pushing for closing.

According to another advantageous feature of the present invention, the coupling element can be a sleeve disposed on the pivot axis, said sleeve being movable in opposition to the structure and forming a slotted guide in interacting relationship with the pivot axis. In this embodiment, the sleeve is not traversed by the rod which forms the pivot axis, but rests on a section via which the cover element is pivotally supported for example on the outer rim of the wheel rim. The pivot axis thus engages in the sleeve, where the slotted guide is for example realized in form of a ball screw or the like. The sleeve itself in turn is movably coupled to the cover element, insofar as the forced guidance is initiated when the cover element moves radially outward due to centrifugal force, i.e. the cover element is folded about the pivot axis into the closed position. However, the movable coupling to the cover element is also elastic via the elasticity insofar as the cover element can be pushed from the open position into the closed position by a limited force which acts from outside, wherein again merely the elasticity which is preferably realized by a helical spring has to be overcome by pushing.

As previously described, according to the invention it is not only possible to integrate an elasticity in the couple element itself. Rather, the coupling element according to the invention can itself be supported against such an elasticity on the wheel rim side and/or cover element side. The coupling element, i.e. a stiff coupling rod is thus supported on the wheel rim and/or the cover element against an elastic element, via which the elastic movement in the region of the coupling element which forms the elasticity which has to be overcome by pushing, is realized. According to the invention, such an elasticity can be realized by means of an elastically deformable plastic or rubber element, against which the coupling element is moved when the cover element is to be pushed into the closed position. This can be a plastic or rubber component of any shape, preferably for example a plastic or rubber ring in which the coupling element, i.e. for example the coupling rod, engages with a corresponding bearing section. The plastic or rubber element in particular in the form of the ring, is correspondingly fixed in the wheel rim side and/or cover element side, for example received in a corresponding mounting which is provided there, or in corresponding geometric recesses and the like.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
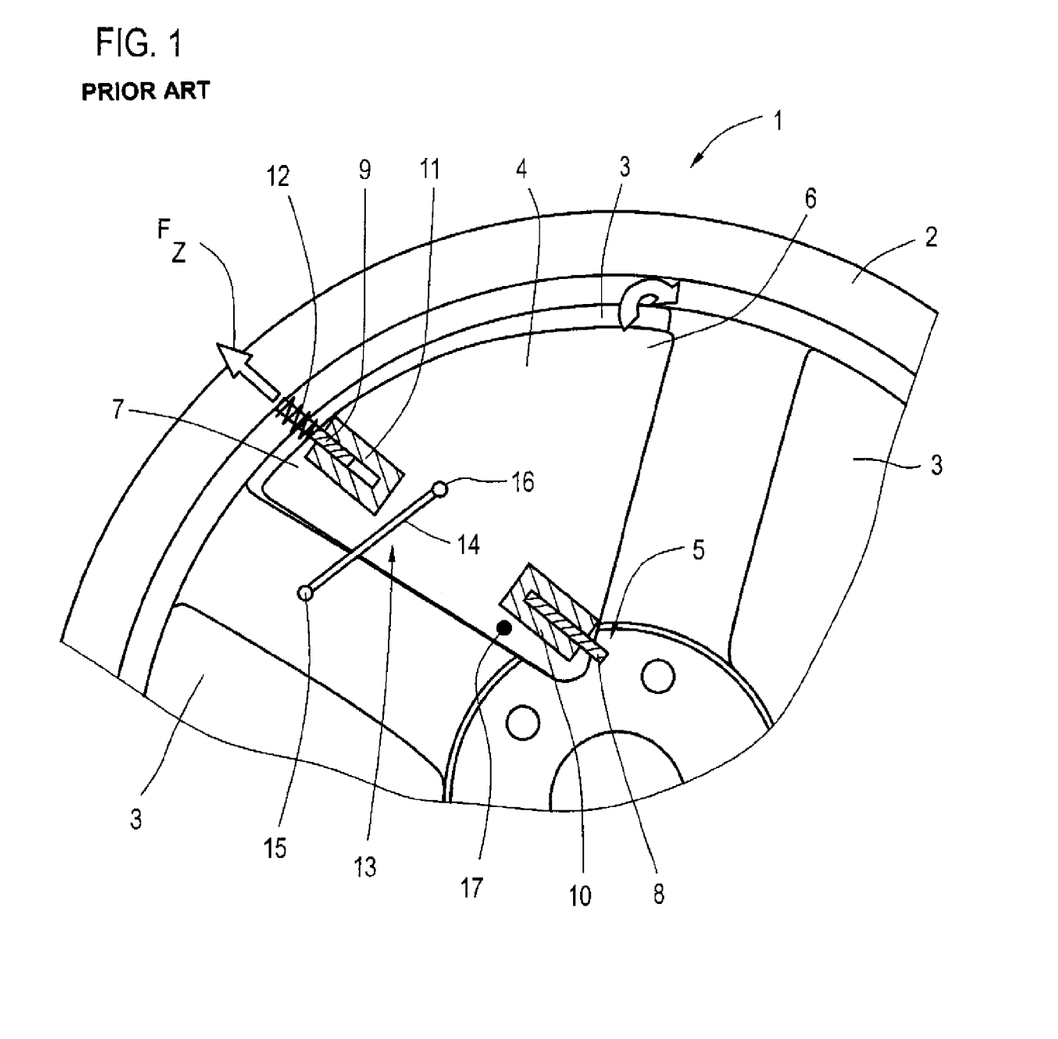
FIG. 1 is a schematic representation of a part of a conventional vehicle wheel in a resting state.

Turning now to the drawing, and in particular to FIG. 1, there is shown a schematic representation of a part of a vehicle wheel 1, including a wheel rim 2, to which when mounted, a brake pot which is not further shown here and a brake disc which is fastened to the brake pot are usually fastened or assigned respectively. The wheel rim 2 has multiple openings 3 which serve the esthetic and for ventilation, to which openings 3 in the shown example a respective plate shaped cover element 4 is assigned, wherein in FIG. 1 only one such cover element 4 is shown. This cover element 4 serves for closing the respective opening 3 and to open the opening for aeration when needed.

For this purpose, the cover element 4 is pivotal about a pivot axis 5, for example 5°-10°. The representation according to FIG. 1 (this also applies to all following representations) is an inside side view of the wheel rim 2. Each cover element 4 is pivotal about the pivot axis 5 such that each cover element 4 pivots to the inside of the wheel rim with its right outer corner 6 shown in FIG. 1, i.e. out of the drawing plane towards the observer. The left upper corner 7 on the other hand pivots into the drawing plane, i.e. away from the observer toward the outside of the wheel rim. This is shown in the open position shown in FIG. 1, i.e. the cover element 4 is shown in an open position, in which the right upper corner 6 is pivoted inward, i.e. toward the observer, while the left upper corner 7 is pivoted outward away from the observer. Thus ventilation gaps are formed. The pivot bearing is here realized via two axis pins 8, 9, which are received longitudinally movable in corresponding mountings 10, 11 which are arranged on the inside of each cover element 4. Both sections 8, 9 are fixed in position on the wheel rim 2 in corresponding receptacles.

The radially outward positioned mounting 11 is supported against a spring element 12 in the shown example a helical spring. This spring element 12 serves for exerting a restoring force on the cover element 4 when the latter migrates outwardly due to centrifugal forces when the wheel rotates, which will be discussed below.

Further provided is a coupling element 13 here in the form of a rigid rod 14, which is supported on the wheel rim 2 as well as the cover element 4 via respective ball joint bearings 15, 16, i.e. it is received movable relative to the wheel rim 2 or the cover element 4 via these ball joint bearings 15, 16.

Further provided is a thermally controlled actuating element 17 which is only shown schematically here, which as customary in the state of the art is a bimetal actuator or a memory alloy actuator. This actuating element 17 is provided on the vehicle wheel 1 or assigned to the vehicle wheel. It can be arranged on the wheel rim or on the brake pot. Via this actuating element 17 a pressure is locally applied to the inside of the cover element shown in the Figures. This pressure serves for moving the cover element 4 from its closed position into the open position, i.e. for pivoting about the pivot axis 5.

FIG. 1 shows the vehicle wheel in the resting state or at very low rotational speed. No or a very small centrifugal force acts on the cover elements 4, which are still in the open position.

Figure 2:
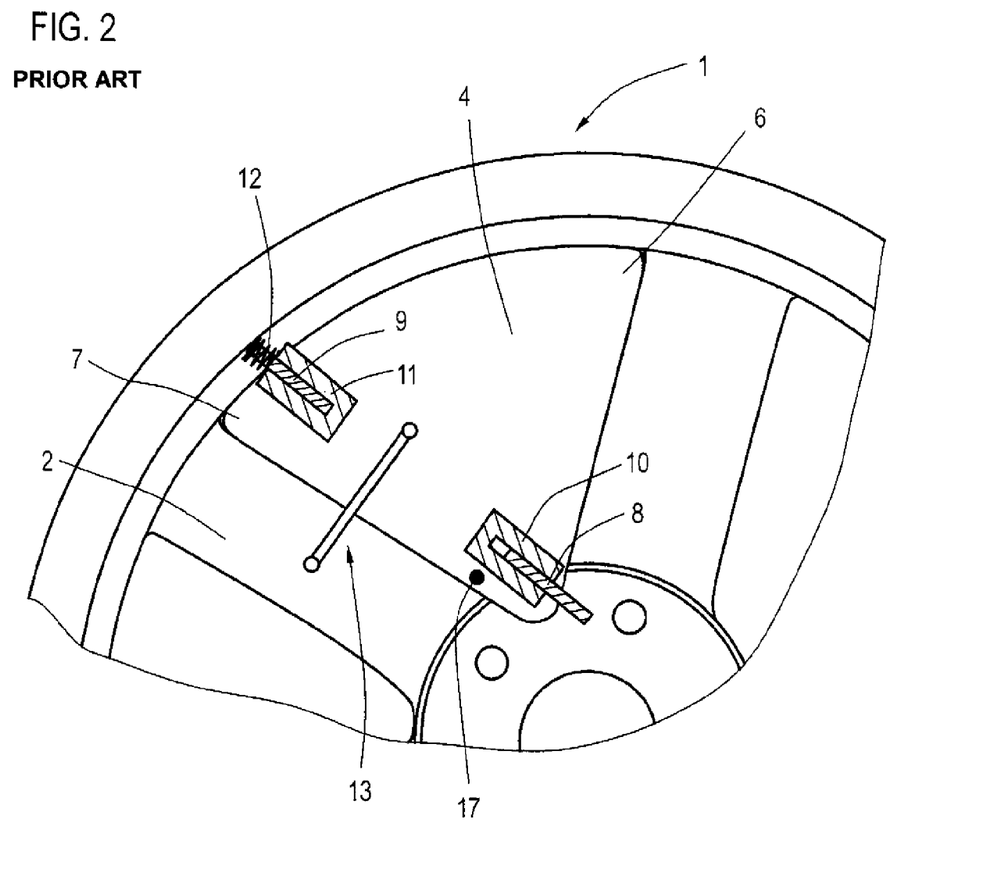
FIG. 2 is a schematic representation of the vehicle wheel of FIG. 1 in rotation and closed cover element.

When the vehicle wheel rotates faster, i.e. the vehicle on which the respective wheel is located, drives faster, the acting centripetal force increases, as represented with $F_z$ in FIG. 1. As a result, the individual cover elements 4 migrate radially outward along the pivot axis 5. A radial longitudinal movement by a few millimeters to centimeters is given due to construction. Due to the coupling between wheel rim 2 and cover element 4 which is realized via the rigid coupling element 13 a pivoting movement which is superimposed on the longitudinal movement occurs during this longitudinal movement, which pivoting movement forces the respective cover element into the closed position. The coupling element 13 causes thus a forced movement from the open position into the closed position. As can be seen in FIG. 2, the cover element is located slightly farther outside, the inner axis pin 8 is slightly moved out of the mounting 10 and the outer axis pin 9 still lies in the mounting 11. The right corner 6 and the left corner 7 in the respective pivoted-in position, i.e. the position which lies in the drawing plane, and the opening 3 is closed. As a result of the radial movement, the spring element 12 is also compressed, the latter applies a restoring force on the cover element 4. If the rotational speed decreases, this restoring force causes the respective cover element 4 to open again, when the centrifugal force $F_z$ can be overcome again by pushing via the restoring force.

If now the respective cover element is to be opened again at higher driving speed because of the thermal conditions, a pressure has to be built up via the actuating element 17 which is sufficiently high so that, as a result of the rigid coupling a high force which is opposed to the centrifugal force $F_z$ is applied via the coupling element 13, which moves the cover element 4 back on the same movement and pivot path so that it assumes the open position shown in FIG. 1. The centrifugal force $F_z$ can be significant depending on the rotational speed, which is why a correspondingly high counter force would necessarily have to be built up for opening. This, however, can hardly be accomplished in the state of the art by using bimetal strips or the like.

Figure 3:
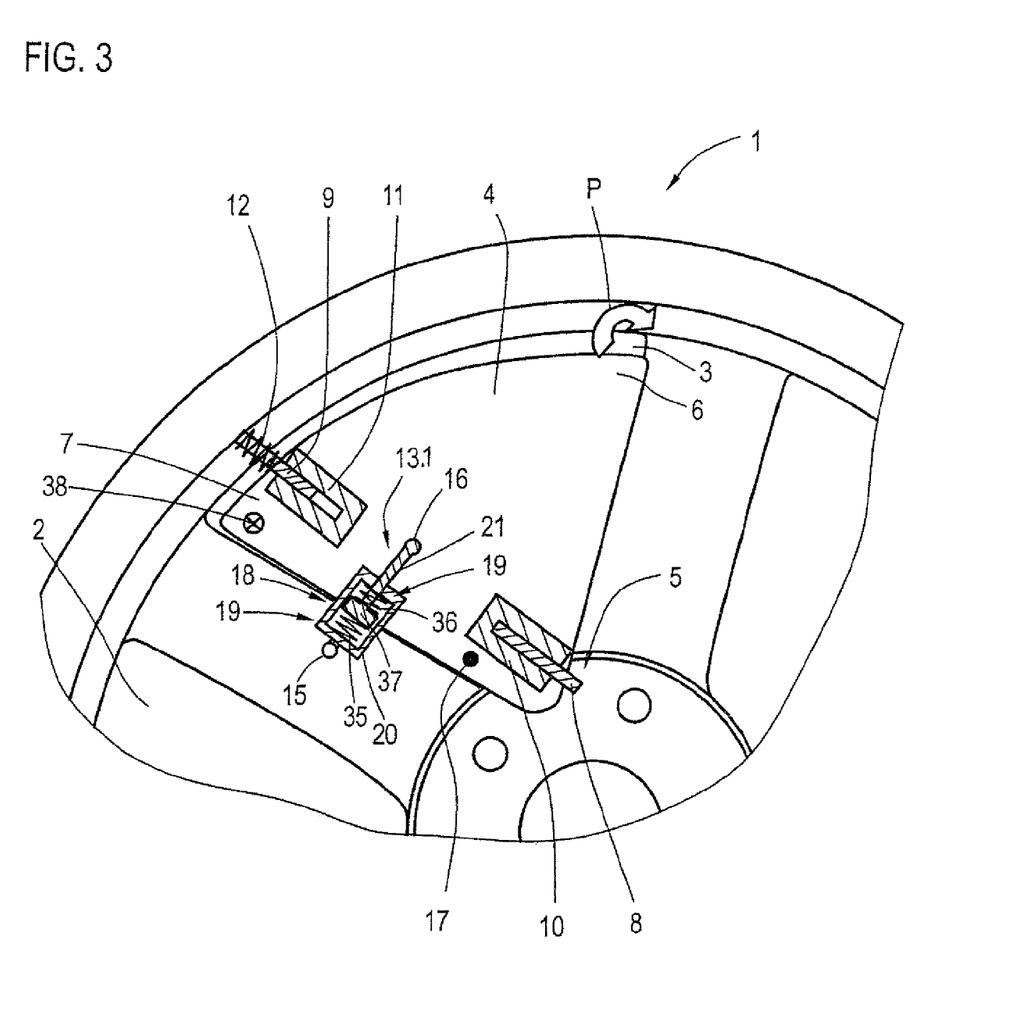
FIG. 3 is a schematic representation of a vehicle wheel according to the invention in a partial view with a coupling element with a single double acting elasticity, with a cover element which is in the open position.

In contrast, FIG. 3 shows a vehicle wheel 1 according to the invention, wherein same reference signs are used for same components. In this Figure, as in the following Figures, a thermal actuating element 17 is shown which serves for pushing open a cover element during the drive to ventilate the brake. Further, a respective integrated elasticity is provided which limits the force required for this pushing open movement from the closed position into the open position. These elements, i.e. the actuating element as well as the elasticity which limits the force required for this movement are not relevant for the invention, the invention rather relates to the elasticity shown in the further Figures which enables a pushing of the cover element with limited force from the open position assumed by the cover element at low rotational speeds or at standstill, into the closed position in which it lies within the wheel rim plane or is even able to pivot through. This means that the actuating element and the first mentioned elasticity do not have to be provided, and are also sometimes not required depending on the configuration of the vehicle or the braking system and/or the operating mode of the vehicle. In the Figures, they are shown nevertheless and are explained in the following because they can generally be also provided. The focus however is on the elasticity which enables the movement of the cover element from the open position into the closed position with limited force. This means, that the embodiments which have double-acting elasticities may also only have the elasticity which limits the force required for the movement from the open into the closed position.

The vehicle 1 includes also a wheel rim 2 with various openings 3 as well as cover elements 4 assigned to the latter. These are again pivotal about a pivot axis 5. The pivot axis 5 is realized via appropriate axis pins 8, 9 with corresponding mountings 10, 11 on the cover element 4. Again, a spring element 12 is provided which is compressed when moving radially outward and builds up the restoring force required for guiding back at sufficiently low rotational speed.

FIG. 3 shows an embodiment of a vehicle wheel 1 according to the invention, in which a double acting elasticity is provided on the coupling element 13.1. FIG. 3 shows the resting vehicle wheel 1 with cover element 4 in the open position. The right upper corner 6 is pivoted inward, i.e. toward the observer, while the left upper corner is pivoted outward, i.e. away from the observer.

As in the exemplary embodiment according to FIG. 3, the coupling element 13.1 is formed by a quasi cylindrical component 21. The integrated elasticity 18 is arranged in the cylindrical component 20, which integrated elasticity 18 is here realized double acting and by means of two spring elements 19, here also with two helical springs 35, 36. The helical springs 35, 36 rest against different sides of the piston 37 of the component 21, i.e. they are supported on the piston 37, and on the respective other side on the cylindrical component 20. This means, that the piston 37 is supported against one helical spring in both directions of movement.

Figure 4:
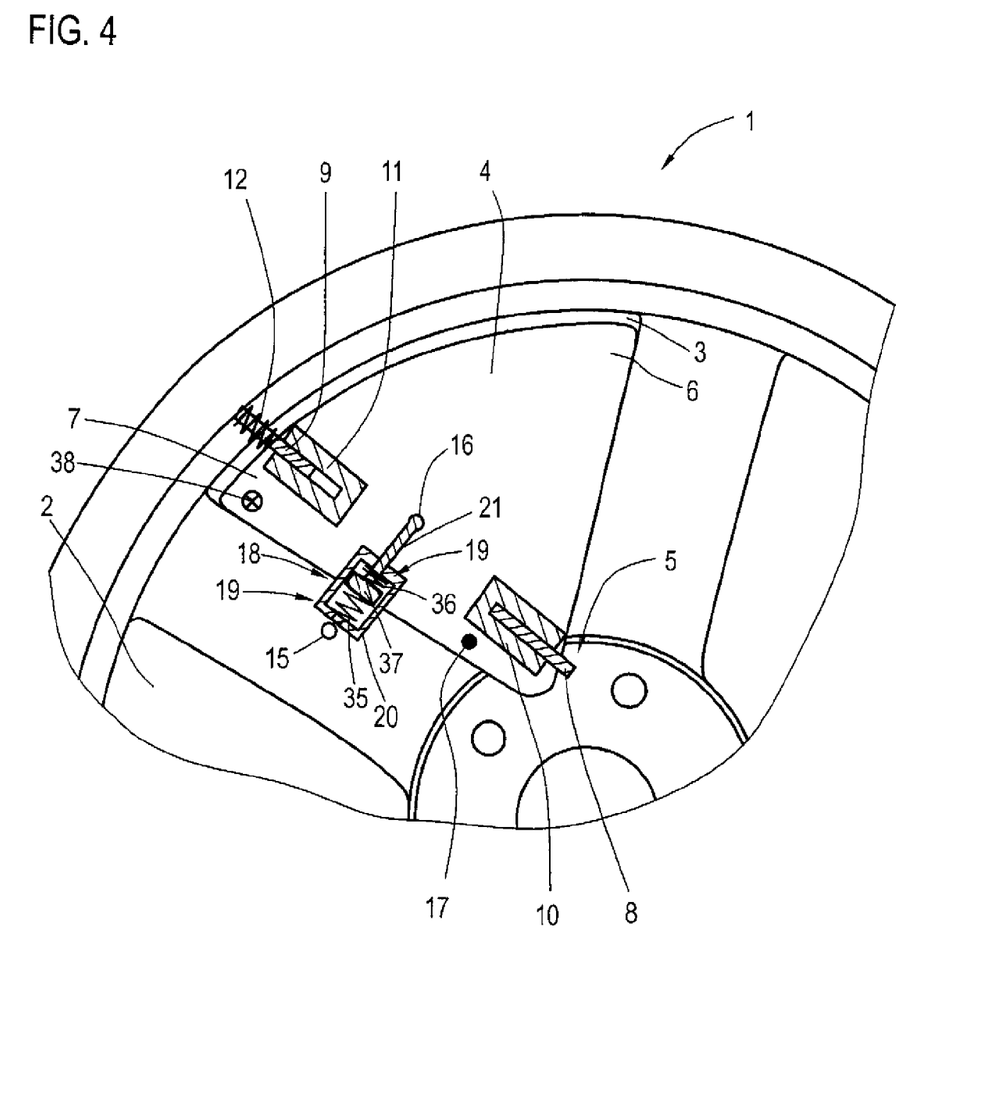
FIG. 4 is a schematic representation of the vehicle wheel of FIG. 3 with the cover element moved into the closed position.

The helical spring 35 serves for limiting the force required for transitioning from the closed position into the open position realized via the actuating element 17, following the description with regard to FIGS. 3 and 4.

The second helical spring 35 serves for limiting the force required for moving the cover element 4 from the open position shown in FIG. 3 into the closed position shown in FIG. 4.

It is assumed that the pivoted out corner 7 of the cover plate is pushed on as shown in FIG. 3 by the symbol 38. As a result, a pivoting of about the pivot axis 5 occurs, however, without actuating the forced coupling, thus without moving the cover element 4 along the pivot axis 5. This is because when pressure is applied to corner 7 the spring element 36, see FIG. 4, is compressed, while spring element 35 slightly elongates. Thus, in order to pivot in, for example when impacting a curb or in order to intentionally or unintentionally manually pushing in, it is merely required to overcome the elasticity 18, here realized via the helical spring 36, by pushing, i.e. to compress the helical spring 36. The relaxing spring 35 has a supporting effect. A slight pivoting in movement of the coupling element 13.1 results, however no axial forced guiding. The pivoting in movement is indicated by the arrow P in FIG. 3.

Of course, it is also possible to provide only a single acting elasticity 18, which limits the force required for the described pivoting in movement. In this case, only the helical spring 36 would be provided, the helical spring 35 would not be integrated. This means that the elasticity only acts on one side. In this case, only the movement from the open position into the closed position would be decoupled, i.e. limited with regard to the force, however, not the movement from the closed position into the open position.

The function of the elasticity which is realized by means of the helical spring 35 would be the following. When the vehicle wheel 1 rotates, the rotational speed is so high that the centrifugal force causes the cover elements 4 to move radially outward and to move from the open position, in which the corners 6, 7 are pivoted out, into the closed position. The pivot movement which is superimposed on the radial longitudinal movement is here also forced via the coupling element 13.1 which is sufficiently stiff in spite of the integration of the elasticities 18 and here in particular the helical spring 35; here as well a forced coupling is thus realized.

However, if an opening 3 is to be partially opened because of the temperatures existing in particular in the region of the brake, in order to enable an air flow through the wheel rim, this is possible by means of a thermally controlled actuating element in form of a bimetal strip or in particular an expansion material element, because as a result of the couple element side integrated elasticity 18 a force which is larger than the acting centrifugal force is no longer required but rather a much smaller force. If the actuating element pushes on the inside of the cover element 4, the latter pivots about the pivot axis 5, during which movement the couple element is quasi compressed, wherein in the shown double acting elasticity the helical spring 36 which relaxes, supports. As a result of the integrated elasticity 18 by means of the helical spring 35, i.e. the telescopic, instable configuration of the coupling element 13.1, it is possible to deform the latter by applying a relatively small force. Only the resistance which is formed by the helical spring 35, has to be overcome by pushing via the actuating means 17. The cover element 4 retains its radial extended position, it merely pivots about the pivot axis 5 while at the same time pushing back or deforming, respectively, the spring element 19. The position or orientation respectively, of the coupling element 13.1 is essentially retained, because it merely shortens, but no radial movement occurs. As can be seen, the right corner 6 is pivoted out of the drawing plane toward the observer, while the left corner 7 is pivoted into the drawing plane away from the observer. In the respective Figures, the pressure point, at which the actuating element 17 applies its force on the cover element 4, lies left of the pivot axis 5 when viewed radially. However, because the connection point of the ball joint 16 lies on the right side, i.e. on the other side of the pivot axis, this coupling element 13.1 is compressed as a result of the pivoting up out of the drawing plane of this cover element section which lies on the right side of the pivot axis.

As soon as the actuating element 17 reduces the pressure, i.e. relieves, the integrated elasticity 18, i.e. the spring element, pushes the component 21 out of the component 20 again, the coupling element elongates again, via which the cover element 4 is pushed into the closed position again. This all occurs during the rotation of the vehicle wheel 1, which rotation can have any speed and the resulting centrifugal force $F_z$ can be of any strength because the rotational speed and the centrifugal force $F_z$ for initiating the opening of the cover element via the actuating element 17 is irrelevant.

Figure 5:
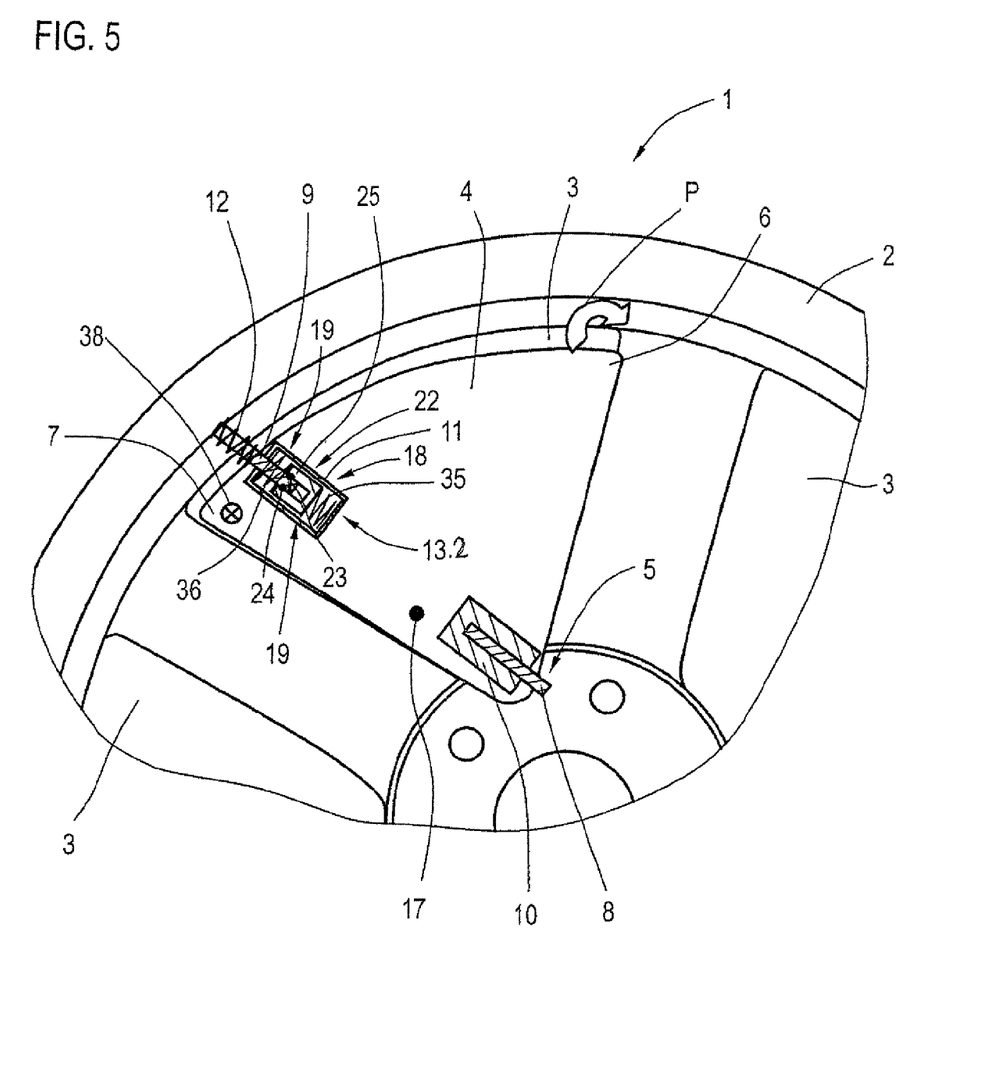
FIG. 5 is a schematic representation of a vehicle wheel according to the invention of a further embodiment in a partial view with integrated double acting elasticity with the cover element in the open position.
Figure 6:
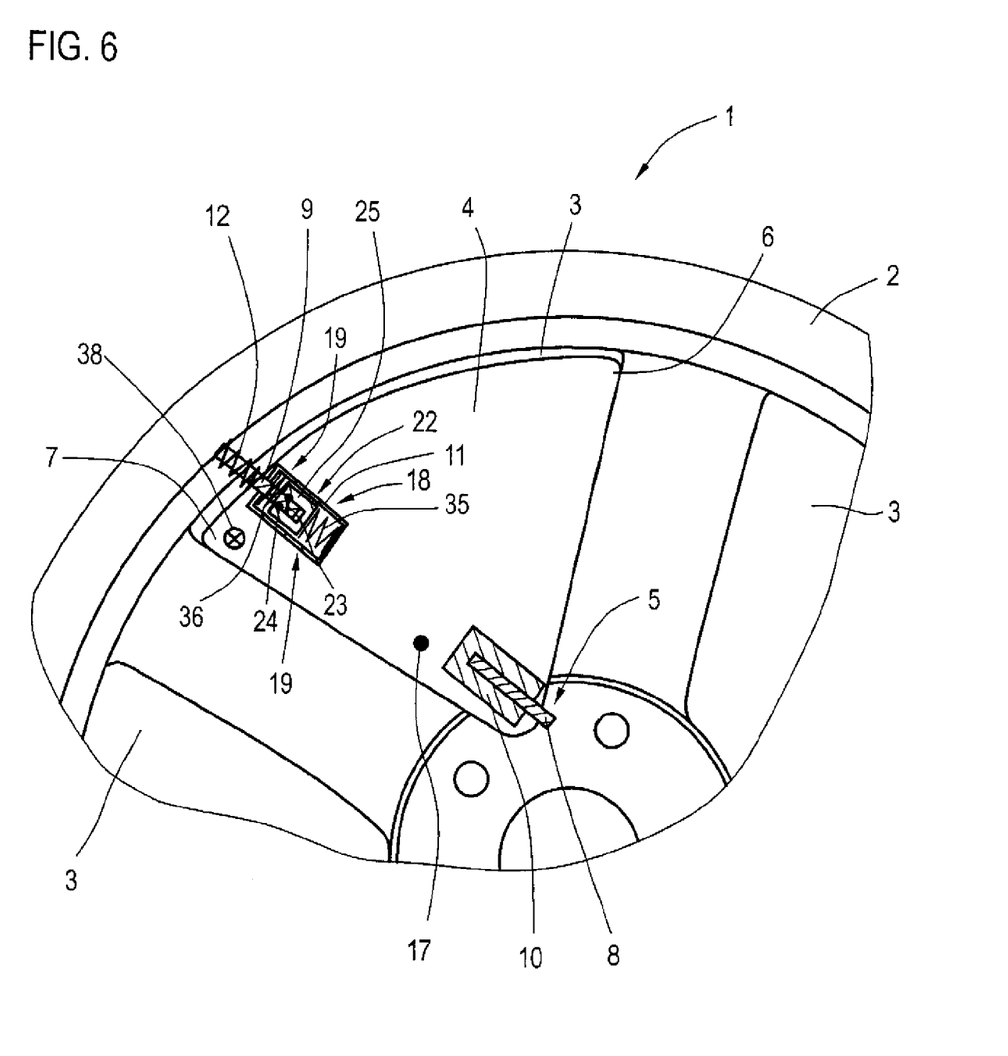
FIG. 6 is a schematic representation of the vehicle of FIG. 5 with closed cover element.

FIGS. 5 and 6 show a further exemplary embodiment of vehicle wheel according to the invention again including a wheel rim 2 with openings 3 and cover elements assigned to the latter, wherein her again only one cover element 4 is shown. The latter is again realized via a pivot axis 5 formed by the two axis pins 8, 9 and their respective mountings 10, 11.

A coupling element 13.2 is also provided here, which however, is configured different than according to the previous Figures. The coupling element 13 forms a slotted guide which is here configured as ball screw 22. The axis pin 9 is arranged on the wheel rim in a rotationally fixed manner. Provided on the axis pin 9 is an outer threading 23 which is only shown schematically, in which again only shown schematically, balls 24 run which are provided on a ball sleeve 25. The ball sleeve 25 which quasi forms a kind of nut, is again received in a rotationally fixed manner in the mounting, which thus represents a kind of outer sleeve. An elasticity 18 is again provided in the mounting 11, here again in the form of a helical spring 19, against which the sleeve 25 is supported. Here again, a double acting elasticity 18 is integrated, again realized by means of two spring elements 19 in the form of two separate helical springs 35, 36. The two helical springs 35, 36 are arranged inside the mounting 11. One of the helical springs 35 engages on the bottom of the mounting 11, the other end is supported on the bottom side of the sleeve 25. The other helical spring 36 engages on the top side of the sleeve 25 and on the other end of the mounting 11. This means, that the sleeve 25 (similar to the piston 37 according to the embodiment according to FIGS. 3 and 4) is supported on both sides against one respective helical spring 35, 36.

The helical spring 35 again has the same function as helical spring 19 which forms the single acting elasticity 18 in FIG. 3. It serves for limiting the force when transitioning from the closed position into the open position, as a result of an action of the actuating element 17. Hereby, the force required for moving the cover element is limited in spite of a high centrifugal force as described before.

The second helical spring 36 serves for limiting the force required for movement from the open position shown in FIG. 5 into the closed position shown in FIG. 6. Here again the symbol 38 indicates that the pivoted out corner 7 of the cover element 4 is pushed on from outside, i.e. from the drawing plane. As a result the mounting is twisted and with this the sleeve relative to the axis pin 9 which is fixed in position. The sleeve 25 moves slightly outward along the axis pin 9, so that the helical spring 36 is compressed, see FIG. 6. The cover element 4 can pivot in, transitions into the closed position shown in FIG. 6, without the occurrence of significant longitudinal shifting of the cover element along the pivot axis 5. Because here, the movement is decoupled also in this direction of movement via the integrated helical spring 36, i.e. the elasticity 18, as in the embodiment according to FIGS. 3 and 4.

The function of the helical spring 35 is as follows. When the vehicle wheel rotates faster, the centrifugal force $F_z$ increases which leads to the cover element 4 migrating radially outward, as described in the previous embodiment. As a result of the rotationally fixed arrangement of the axis pin 9 and the sleeve 25, a forced pivoting movement about the pivot axis 5 occurs via the ball screw of the ball screw coupling during this longitudinal movement which causes the cover elements 4 to pivot into the closed position, wherein the cover element 4 moves slightly radially outward, the axis pin 8 engages to a lesser degree in the mounting 10, while the axis pin 9 remains received in the sleeve 25. The spring element 12 is compressed. The elasticity 18, i.e. the helical spring 35 is not yet loaded because it is not significantly loaded during this radial longitudinal and pivoting movement.

If now the respective cover element 4 is to be opened at high rotational speeds via the thermally controlled element 17 which is also provided here, for example an expansion material element, the actuating element 17 pushes on the inside of the respective cover element. As a result of the pressure, the sleeve 25 which is rotationally fixed to the mounting 11, which itself is rotationally fixed to the cover element 4, is rotated about the pivot axis 5, namely in a direction opposite to the direction of movement during the radial outward movement. As a result of the coupling of the sleeve 25 to the axis pin 9 which is rotationally fixed to the wheel rim, via the ball screw 22 the sleeve 25 slightly, namely depending on the rotational angle, moves into the inside of the receptacle 11, and thereby compresses the spring element 19, i.e. the elasticity. The radial position of the cover element 4 remains unchanged, since only the sleeve 25 moves slightly along the pivot axis. However this migrating movement is only transferred to and compresses, the spring element 19, because the sleeve is arranged rotationally fixed yet axially movable in the receptacle 11. Also in this case, only the spring element has to be overcome by pushing. The resistance posed by the ball screw 22 is negligible in comparison. This means that also in this case the respective cover element 4 can be opened by using a relatively small force even at high rotational speed, without the required force being even approximately in the range of the existing significantly high centrifugal force $F_z$.

Of course, only a single acting elasticity can be provided here as well, which limits the force required for a movement from the open position according to FIG. 5 into the closed position according to FIG. 6. In this case, only the helical spring 36 would be provided for forming the elasticity which would then be only single acting; the helical spring 35 would not be present. This means that in the decoupling and force limiting realized in the embodiment according to FIGS. 5 and 6 would not be given in a movement from the closed position into the open position induced by the actuating element 17.

Figure 7:
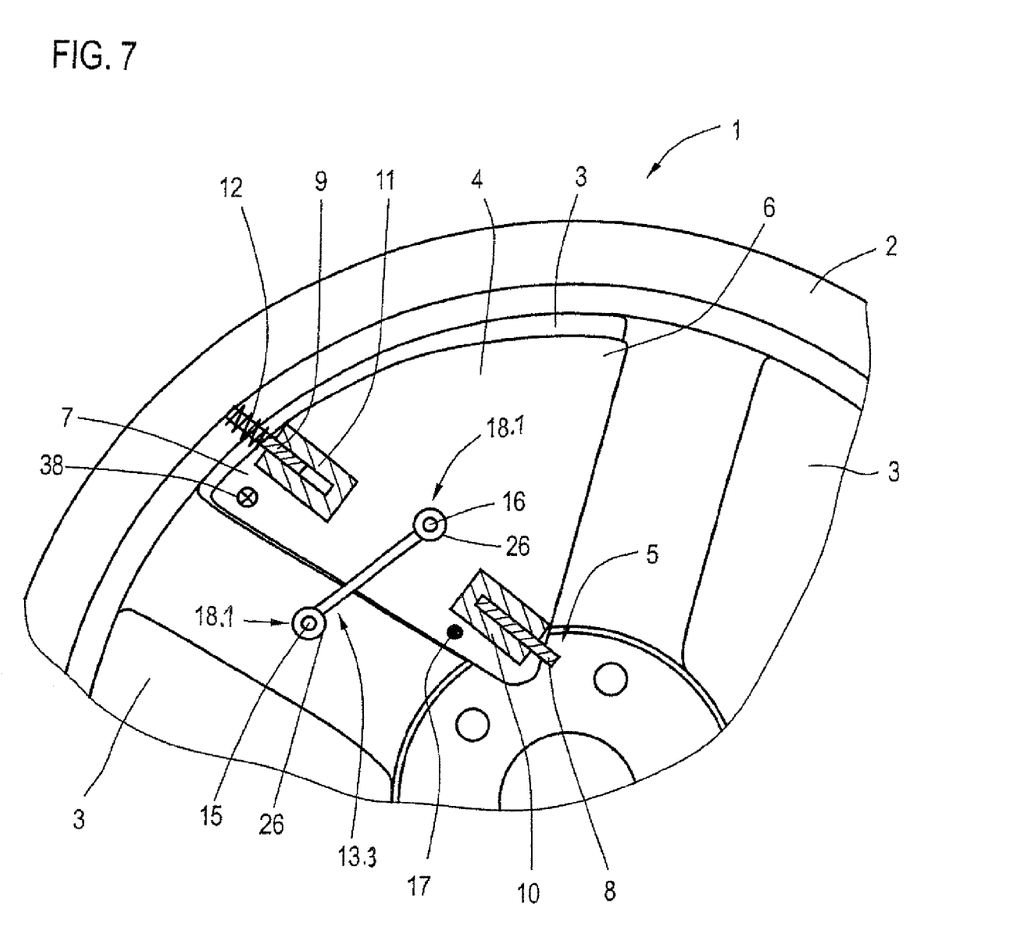
FIG. 7 is a schematic representation of a vehicle wheel according to the invention of a further embodiment with elasticities provided bearing side, with the cover element in open position.
Figure 8:
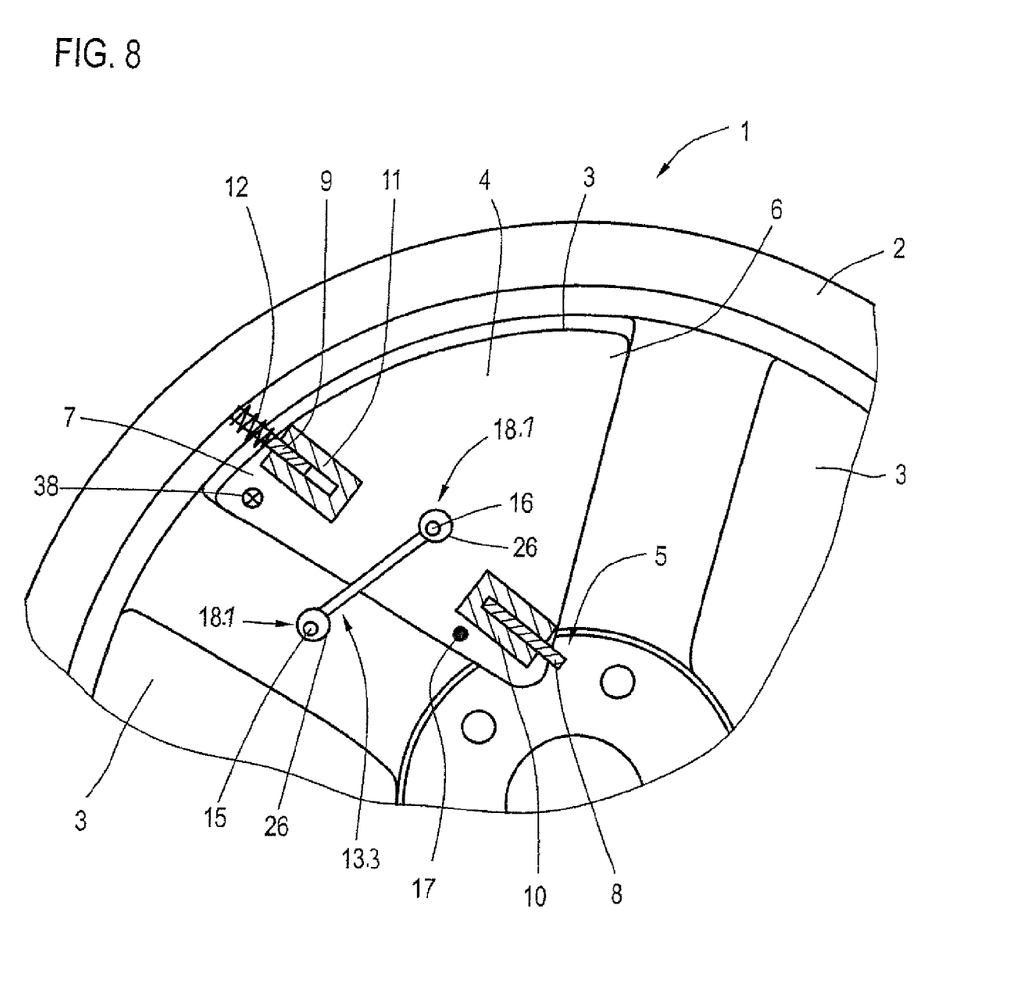
FIG. 8 is a schematic representation of the vehicle wheel of FIG. 7 with cover element pushed into closing position.

FIGS. 7 and 8 show a further embodiment of a vehicle wheel 1 according to the invention, again including a wheel rim 2 with openings 3 and assigned cover elements 4, which are pivotal about a pivot axis formed via the previously described axis pins 8, 9 in their respective mountings 10, 11. The coupling element 13.3 is here configured again as stiff rod 14, which is here configured as one-piece, however in the region of their bearings 15, 16 which do not necessarily have to be configured as ball joint bearings, is supported via corresponding elasticities 18.1 on the wheel rim 2 or the cover element 4 respectively. This means that here the elasticity is not integrated quasi couple element side, but is placed in the region of the respective bearings of the coupling element on the wheel rim 2 or the cover element 4 respectively. The elasticities 18.1 are for example realized in form of rubber or plastic rings 26 which are fixed at corresponding sites on the wheel rim and on the cover element. Although the respective elasticities 18.1 are provided in the region of the bearings 15, 16 only one elasticity 18.1 can also be provided. The elasticities are in the instant case realized by means of plastic or rubber rings 26. These can be deformed in all directions, no preferred direction of deformation exists. Due to their integration in the region of the bearings 15, 16, these rubber or plastic rings thus represent dual-action elasticities. They can be deformed in one direction and as a result limit the force required for movement from the open position (FIG. 7) to the closed position (FIG. 8). The resulting deformation is shown in FIG. 8. Also in this case only the stiffness defined by the material of the rubber or plastic rings 26 has to be overcome by pushing to effect the change in position. The elasticities can on the other hand also limit the force required when transitioning from the closed position to the open position. In this case the elasicities are deformed in the opposite direction.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A vehicle wheel comprising:
   a wheel rim;
   plural plate shaped cover elements mounted on the wheel rim for pivoting about a pivot axis for temporarily closing corresponding openings in the wheel rim;
   a coupling element provided for each cover element for connecting the cover element to the wheel rim and guiding the cover element from an open position into a closed position during a movement of the cover element along the pivot axis in response to a centrifugal force; and
   an elastic structure operatively connected with the coupling element for limiting a force required for moving the cover element from the open position to the closed position.

2. The vehicle wheel of claim 1, wherein the coupling element comprises the elastic structure.

3. The vehicle wheel of claim 1, wherein the coupling element is configured as a coupling rod and is supported on the wheel rim and/or the cover element against the elastic structure.

4. The vehicle wheel of claim 3, wherein the elastic structure is an elastically deformable plastic or rubber element.

5. The vehicle wheel of claim 4, wherein the plastic or rubber element is a ring.

6. The vehicle wheel of claim 1, wherein the elastic structure is formed by at least one spring element or at least one element made of an elastic material.

7. The vehicle wheel of claim 1, wherein the coupling element comprises two sections which are axially movable relative to one another via the elastic structure.

8. The vehicle wheel of claim 7, wherein the elastic structure is a helical spring.

9. The vehicle wheel of claim 7, wherein the elastic structure is a helical spring.

10. The vehicle wheel of claim 1, wherein the coupling element is a sleeve, said sleeve being supported on the cover element via the elastic structure, and wherein the sleeve is traversed by and in interacting relationship with a rod which forms the pivot axis.

11. The vehicle wheel of claim 1, wherein the coupling element is a sleeve disposed on the pivot axis, said sleeve being movable in opposition to the elastic structure and forming a slotted guide in interacting relationship with the pivot axis.

12. A vehicle wheel, comprising:
   a wheel rim;
   plural plate shaped cover elements mounted on the wheel rim for pivoting about a pivot axis for temporarily closing corresponding openings in the wheel rim;
   a coupling element provided for each cover element for connecting the cover element to the wheel rim and guiding the cover element from an open position into a closed position during a movement of the cover element along the pivot axis in response to a centrifugal force; and
   said coupling element being configured as a coupling rod made of an elastic material for limiting a force required for moving the cover element from the open position to the closed position.

* * * * *